United States Patent
Pearce et al.

(10) Patent No.: US 10,110,096 B2
(45) Date of Patent: Oct. 23, 2018

(54) POSITION SENSING SYSTEM

(71) Applicant: Federal-Mogul Controlled Power Limited, Manchester (GB)

(72) Inventors: David Pearce, Laindon (GB); Wayne Maddison, Laindon (GB)

(73) Assignee: FEDERAL-MOGUL CONTROLLED POWER LIMITED, Manchester (GB)

( * ) Notice: Subject to any disclaimer, the term of this patent is extended or adjusted under 35 U.S.C. 154(b) by 62 days.

(21) Appl. No.: 14/431,704

(22) PCT Filed: Dec. 18, 2013

(86) PCT No.: PCT/GB2013/053337
§ 371 (c)(1),
(2) Date: Mar. 26, 2015

(87) PCT Pub. No.: WO2014/106732
PCT Pub. Date: Jul. 10, 2014

(65) Prior Publication Data
US 2015/0311771 A1  Oct. 29, 2015

(30) Foreign Application Priority Data
Jan. 4, 2013  (GB) .................................. 1300132.6

(51) Int. Cl.
*H02K 11/00* (2016.01)
*H02K 29/08* (2006.01)
(Continued)

(52) U.S. Cl.
CPC ......... *H02K 11/0005* (2013.01); *H02K 1/246* (2013.01); *H02K 11/01* (2016.01); *H02K 11/215* (2016.01); *H02K 29/08* (2013.01)

(58) Field of Classification Search
CPC ...... H02K 1/143; H02K 11/215; H02K 29/08; H02K 1/246; H02K 11/01; H02K 11/0005
(Continued)

(56) References Cited

U.S. PATENT DOCUMENTS 5,161,361 A * 11/1992 Talley .................... D01H 1/244
 310/68 B
5,877,568 A * 3/1999 Maes ..................... H02K 29/10
 310/68 B
(Continued)

FOREIGN PATENT DOCUMENTS

CN  101689789 A  3/2010
DE  4307337  9/1994
(Continued)

OTHER PUBLICATIONS

Great Britain Search Report for Application No. GB1300132.6, dated May 30, 2013.
(Continued)

*Primary Examiner* — Naishadh Desai
(74) *Attorney, Agent, or Firm* — Reising Ethington, P.C.

(57) ABSTRACT

A position sensing system for a switched reluctance machine, such as that of an Integrated Starter Generator, Turbogenerator or electric Supercharger wherein the system comprises a pair magnets, a magnet carrier, and a sensor element, wherein the sensor element is mounted upon an end of a rotatable shaft of the SR machine, and wherein the sensor element is mounted on a circuit board, and sits in a well formed by the magnets which are arranged such that the magnetic flux follows a path similar to that of a horseshoe magnet, and whereby magnetic flux produced by the magnets is concentrated within the well of the magnet carrier in a direction normal to the axial direction of the shaft of the SR machine.

4 Claims, 11 Drawing Sheets

(51) Int. Cl.
*H02K 1/24* (2006.01)
*H02K 11/01* (2016.01)
*H02K 11/215* (2016.01)

(58) Field of Classification Search
USPC .................................................. 310/68 B, 46
See application file for complete search history.

(56) References Cited

U.S. PATENT DOCUMENTS

| | | | | |
|---|---|---|---|---|
| RE38,772 E * | 8/2005 | Elsasser | ............... | G11B 17/038 360/97.21 |
| 2006/0063403 A1* | 3/2006 | Kataoka | ................. | H02K 3/522 439/76.2 |
| 2006/0068617 A1* | 3/2006 | Migita | ................... | H02K 3/522 439/76.2 |
| 2008/0024028 A1* | 1/2008 | Islam | ...................... | H02K 5/22 310/187 |
| 2010/0176695 A1* | 7/2010 | Tezuka | ................... | G01D 5/145 310/68 B |
| 2012/0161498 A1* | 6/2012 | Hansen | ............... | B60K 7/0007 301/6.5 |
| 2014/0265696 A1* | 9/2014 | Copeland, Jr. | ......... | H02K 21/44 310/154.02 |
| 2014/0265950 A1* | 9/2014 | Hung | ................ | H02K 11/0021 318/254.1 |
| 2015/0333600 A1* | 11/2015 | Nakano | .............. | H02K 11/0021 310/71 |

FOREIGN PATENT DOCUMENTS

| | | |
|---|---|---|
| DE | 19635280 | 3/1997 |
| DE | 102007031301 | 1/2009 |
| DE | 102007031301 A1 | 1/2009 |
| EP | 2432103 | 3/2012 |
| JP | 05126512 A | 5/1993 |
| JP | 06042907 | 2/1994 |
| JP | 08005312 | 12/1996 |
| JP | 11252887 | 9/1999 |
| JP | 2000318627 A | 11/2000 |
| JP | 2007315184 A | 12/2007 |
| JP | 2013007731 | 1/2013 |

OTHER PUBLICATIONS

International Search Report and Written Opinion for PCT/GB2013/053337. dated Jan. 27, 2015.
English Translation of Japanese Office Action for Japanese Patent Application No. 2015-551218, dated Apr. 18, 2017.
Chinese Office Action for Application No. 201380050234, dated May 3, 2017 (no translation available).
Chinese Office Action for Application No. 201380050234.0; dated Aug. 28, 2017.

* cited by examiner

POSITION SENSING SYSTEM

CROSS-REFERENCE TO RELATED APPLICATIONS

The present application claims priority to International Application No. PCT/GB2013/053337 filed on Dec. 18, 2013, which claims priority to Great Britain Patent Application No. 1300132.6 filed on Jan. 4, 2013.

BACKGROUND OF THE INVENTION

1. Field of the Invention

The present invention relates to a position sensing system for a switched reluctance (SR) machine.

2. Description of the Related Art

Some known SR machines, such as Controlled Power Technologies' Speedstart®, incorporate a sensing mechanism comprising a sensor and a magnet. The stationary sensor senses changes in a magnetic field produced by the magnet, which is mounted on an end of the rotating shaft of the SR machine.

The sensor has a working range, or tolerance band, defined by an upper and a lower value of magnetic flux density. If the magnetic flux density is below the lower value of the tolerance band, the sensor cannot detect it and therefore cannot function correctly. If the magnetic flux density value exceeds the upper value of the tolerance band, the sensor signal becomes saturated.

FIG. 1 is a graphical example of magnetic decay in flux density vs distance in accordance with a prior art sensing system. As shown in this graph, magnetic flux density decreases in a non-linear manner as the sensor is moved away from the magnet. The magnetic field strength of a particular magnet, in combination with the working range of the sensor, dictates a function, or operating range band for the particular sensor/magnet combination.

Whilst phase winding connections can be configured to result in no electromagnetic field along the centerline of the machine (i.e. the position sensor axis) in practice a number of factors may result in a non-zero field. These factors include uneven current sharing in parallel conductors due to localized heating affecting resistivity, differing lengths of winding connections, and rotor eccentricity.

Known SR machines are formed of components of various materials such as steel, plastics and aluminum, having differing coefficients of thermal expansion and magnetic attenuation properties. Since typical operating temperatures of an SR machine could be in the range of −40° C. to 200° C., a significant degree of movement can occur between the sensor and the magnet as a result of thermal expansion of components. This expansion results in a change in the magnetic field strength sensed by the sensor, and at extreme temperatures may result in the magnetic flux density falling outside the working range of the sensor.

Furthermore, the frequent switching of high currents within the SR machine produces electromagnetic interference. Firing phase currents with a small angular position error can result in very high current spikes and unpredictable performance. This is especially true when coils are fired with the rotor is in an unaligned position without the inductance (or rising inductance) to limit the current level.

For this case, when the coils are fired in the unaligned position the stray fields are likely to be much greater since the stator teeth will provide flux into a large air gap and hence the fields will not be fully contained within the steel laminations.

Large currents with a relatively high production of stray fields will cause exacerbated sensor errors. Since the sensor is in the machine control loop it can be anticipated that relatively small position errors can ultimately lead to loss of control.

The present invention is aimed at providing a position sensing system for an SR machine wherein the working range of the sensor is maximized, and wherein the problems discussed above are at least mitigated.

BRIEF SUMMARY OF THE INVENTION

Accordingly the present invention provides a position sensing system as claimed in claim 1.

The magnet carrier and magnet shield of the present invention allows a pair of magnets to be held in a magnet carrier in such a manner so as to concentrate the magnetic flux within a well formed by the magnet and magnet carrier, in a direction normal to a central axis (z-axis) of the shaft.

Preferably, the position sensing system further comprises a sensor shield, which surrounds the sensor element, and which screens the sensor element from external electric interference caused for example by switching of the SR machine.

The position sensing system may further comprise an external shield which surrounds the magnets, magnet carrier, sensor element and circuit board.

BRIEF DESCRIPTION OF THE DRAWINGS

An embodiment of the invention will now be described by way of example only and with reference to the figures in which.

DETAILED DESCRIPTION OF THE INVENTION

Figure 1:
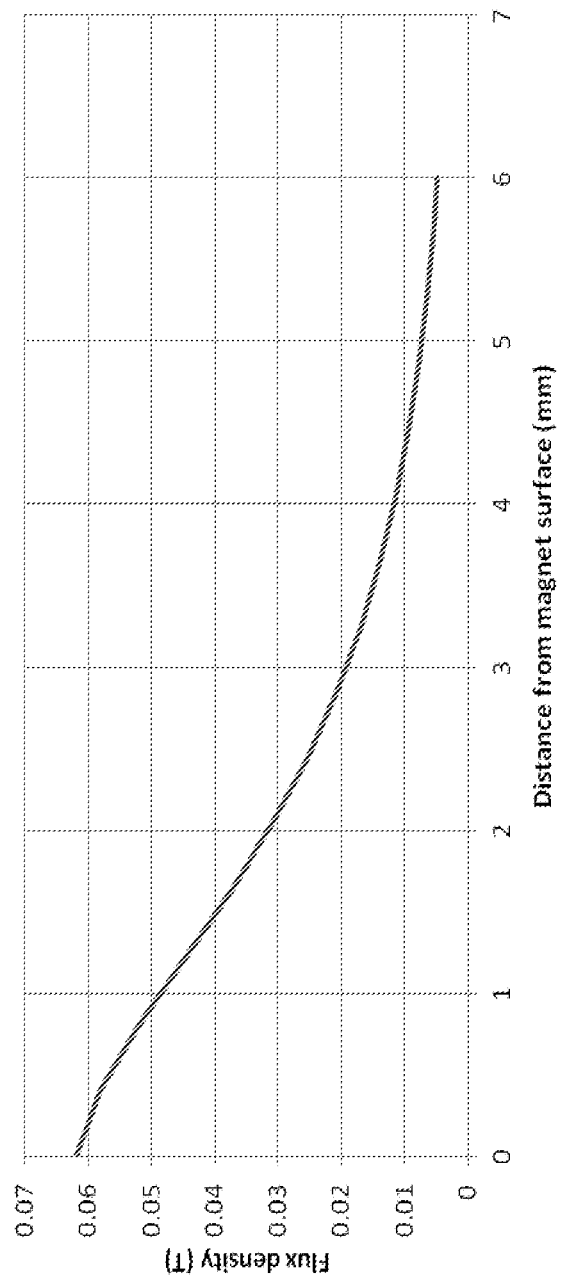
FIG. 1 is a graphical example of magnetic decay in flux density vs distance in accordance with a prior art sensing system.
Figure 2B:
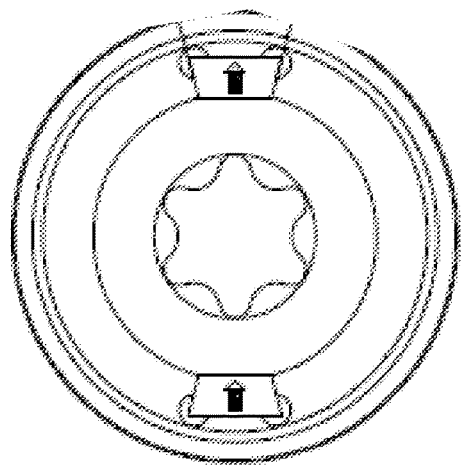
FIG. 2b is a plan view of a magnet carrier in accordance with the present invention.
Figure 2A:
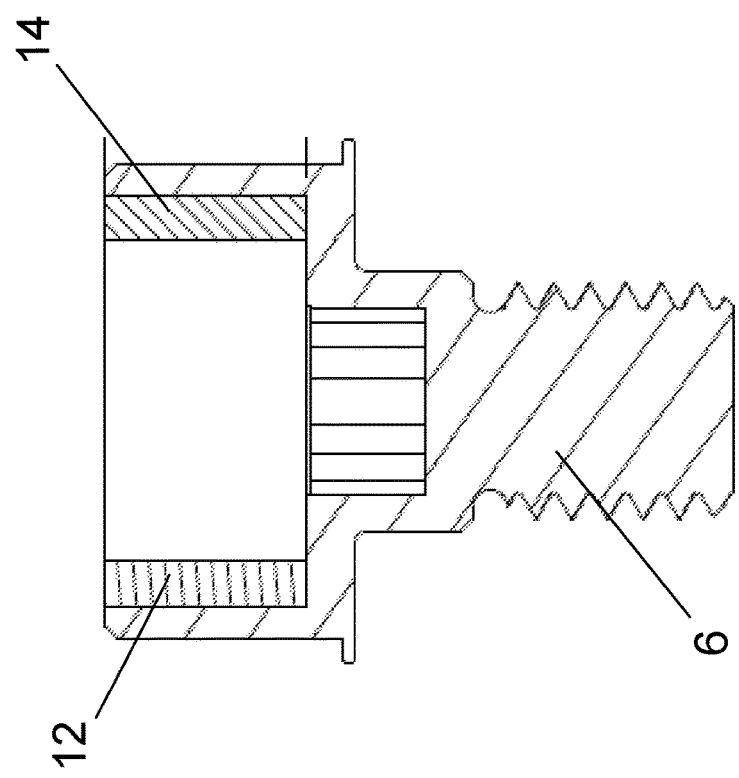
FIG. 2a is a cross-sectional representation of a magnet carrier in accordance with the present invention.
Figure 3:
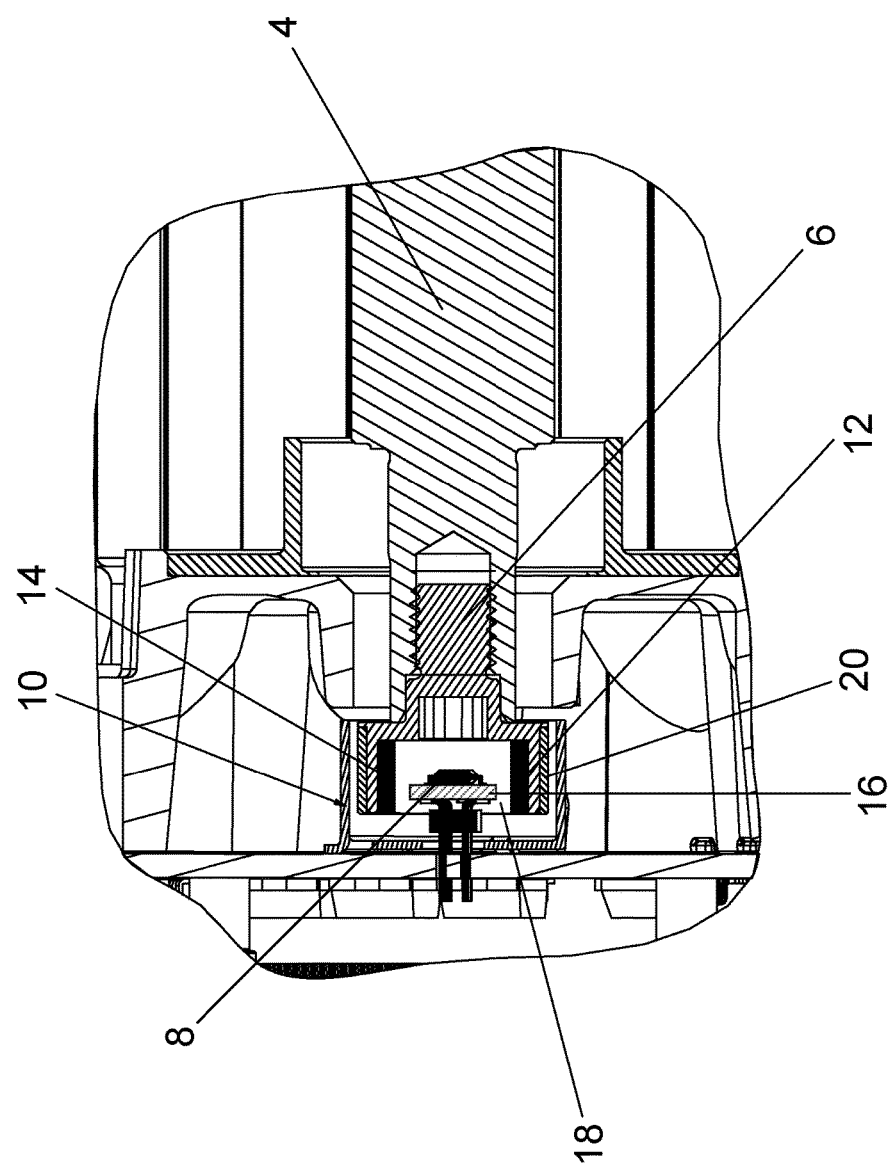
FIG. 3 is a representation of an arrangement of a nested magnet carrier, magnet shield, sensor and sensor shield in accordance with the present invention.
Figure 4:
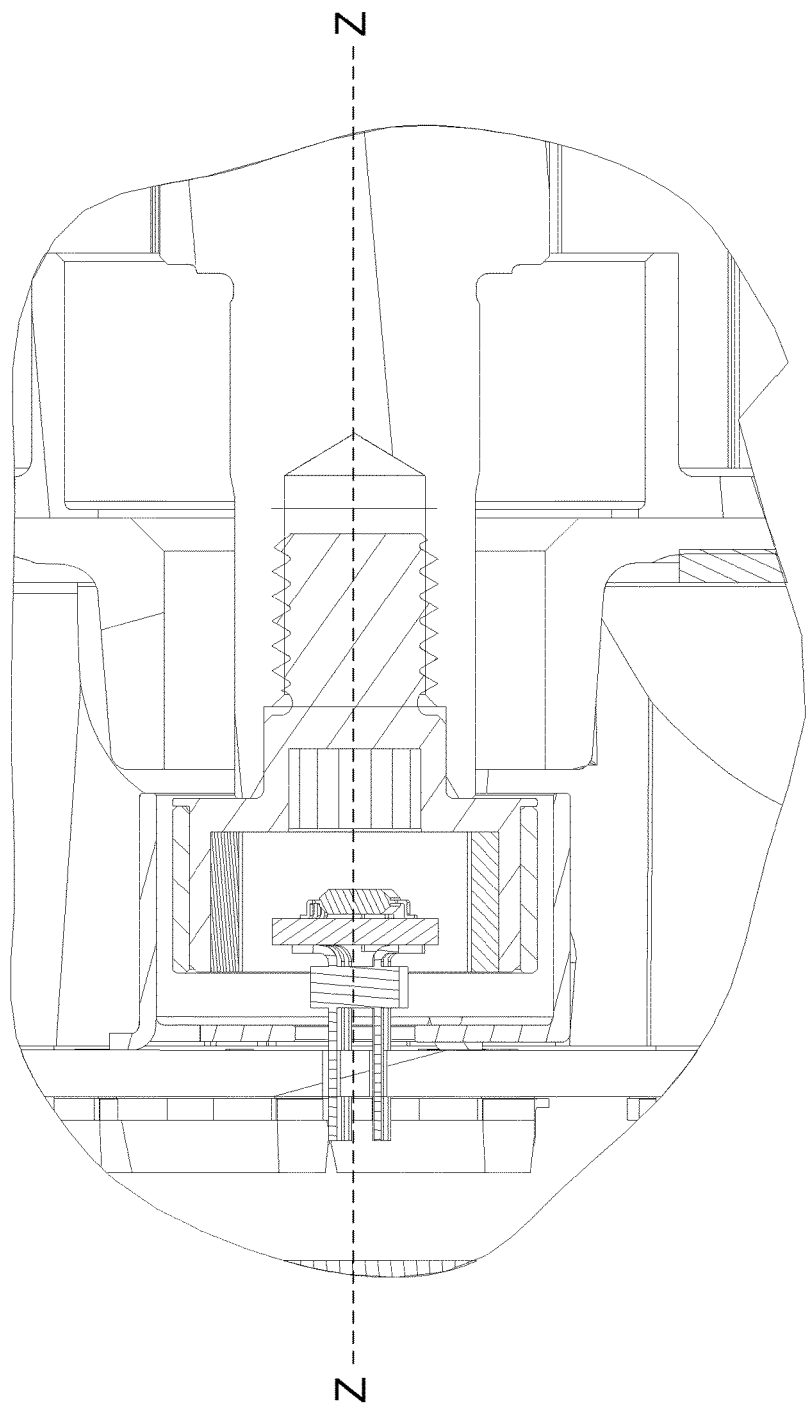
FIG. 4 is a detailed view of the magnet carrier, magnet and sensors of FIG. 3.

Referring to FIG. 3, the present invention comprises a position sensing system for an SR machine having a rotor shaft 4. A central axis of the rotor shaft 4 is indicated by Z-Z in FIG. 4.

The sensing system comprises a magnet carrier 6, a sensor element 8, a sensor shield 10, an external magnet shield 20 and a pair of magnets comprising a first magnet 12 and a second magnet 14.

The sensor element 8 is mounted on a plinth-like circuit board 16 which is aligned with the end of the rotor shaft 4.

The first magnet 12 and the second magnet 14 are arranged in a "horseshoe" arrangement, i.e. such that the magnetic flux follows a path similar to that of a horseshoe magnet. The first magnet 12, second magnet 14 and magnet carrier 6 form a well 18, within which the sensor element 8 and circuit board 16 are positioned.

The sensor shield 10, which is circular in cross-section, surrounds the sensor element 8, and acts to encompasses the magnetic flux from the first and second magnets 12, 14 and also to shield the sensor element 8 from any stray interference, for example that caused by electrical switching of the SR machine.

The external magnet shield 20 surrounds the first magnet 12, the second magnet 14, the magnet carrier 6, the sensor element 8 and the circuit board 16.

The arrangement of the first and second magnets 12, 14 in the magnet carrier 6 effectively form a 'horseshoe' magnet whereby the primary magnetic flux tubes produced by the magnets 12, 14 flow across the internal air space formed within the well 18.

Figure 5:
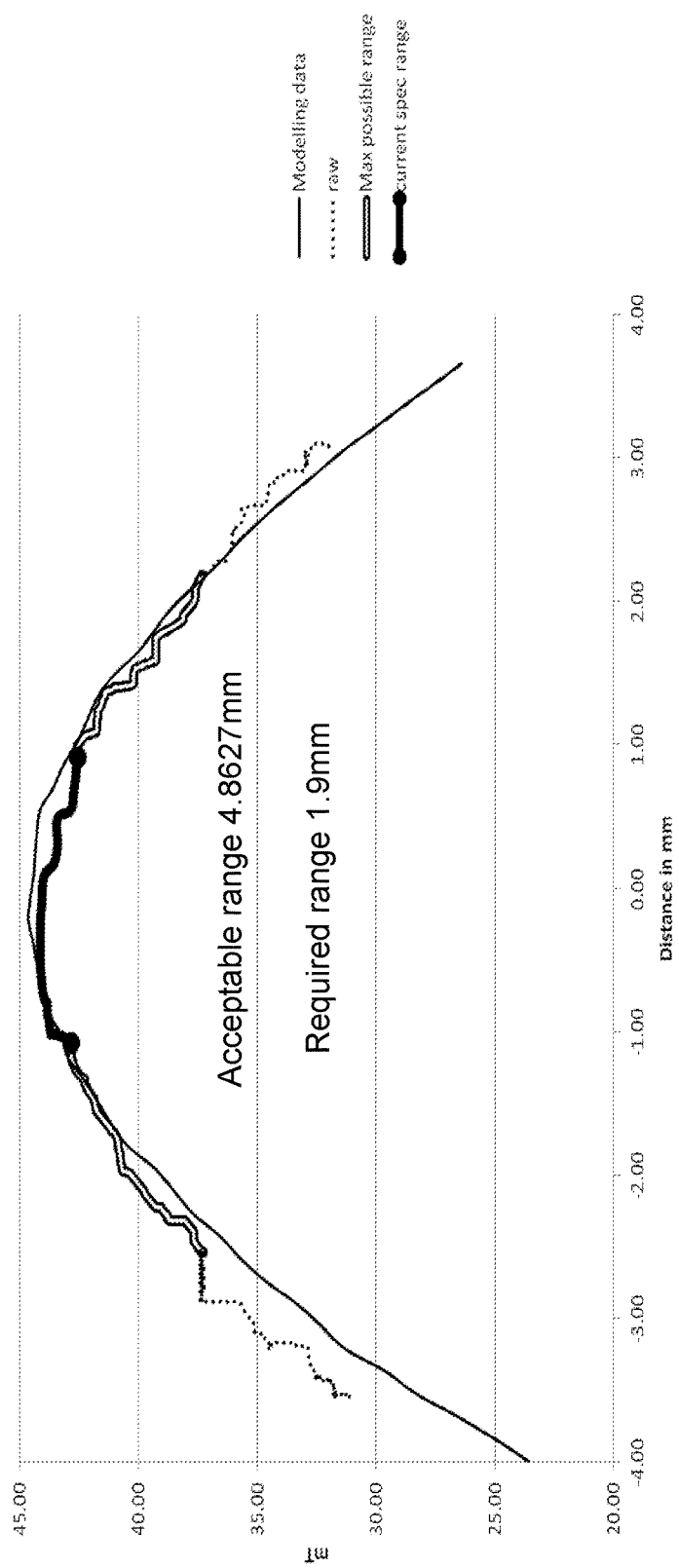
FIG. 5 is a graphical representation of a the axial working range of a prior art sensing system and the axial working range for the present invention.

The combination of the magnets 12, 14, magnet carrier 6, sensor shield 10 and sensor element 8 has been shown to result in a significant increase in the functional range of the sensing system over a wide range of temperatures. For example, the graph of FIG. 5 shows the axial sensitivity, i.e. magnetic flux density against distance from the sensor, for a prior art sensing system (indicated as "current spec range"), and for a sensing system in accordance with the present invention. The sensing system of this graph has a working range of 4.8 mm compared to 2 mm for the prior art system. The graph shows the effect of the shield in reducing the effect of stray magnetic fields close to the sensor element 8.

Figure 6:
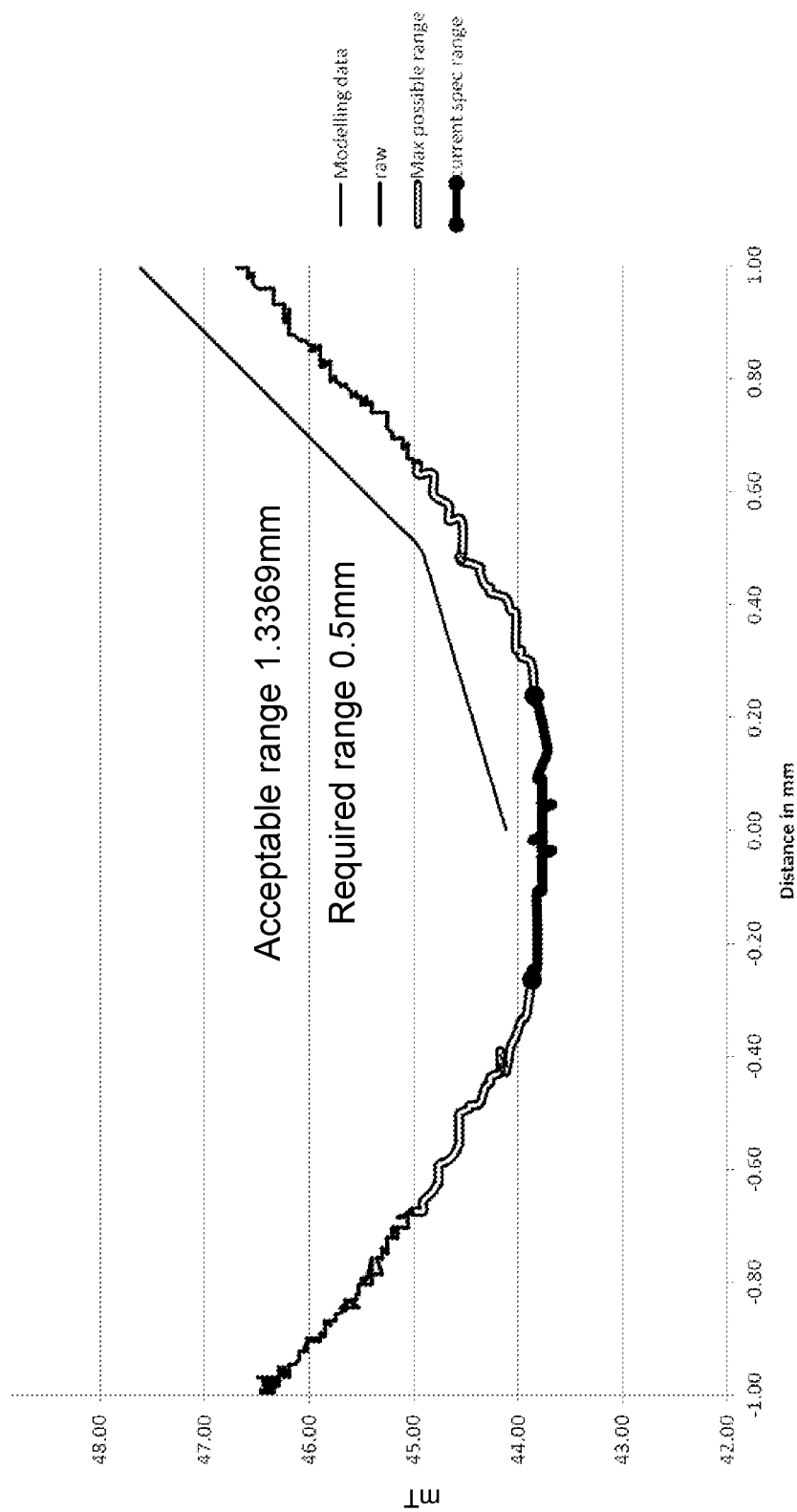
FIG. 6 is a graphical representation of a the radial working range of a prior art sensing system and the radial working range for the present invention.

FIG. 6 shows the radial working ranges of a prior art sensing system (indicated as "current spec range") and of a sensing system in accordance with the current invention.

Figure 7:
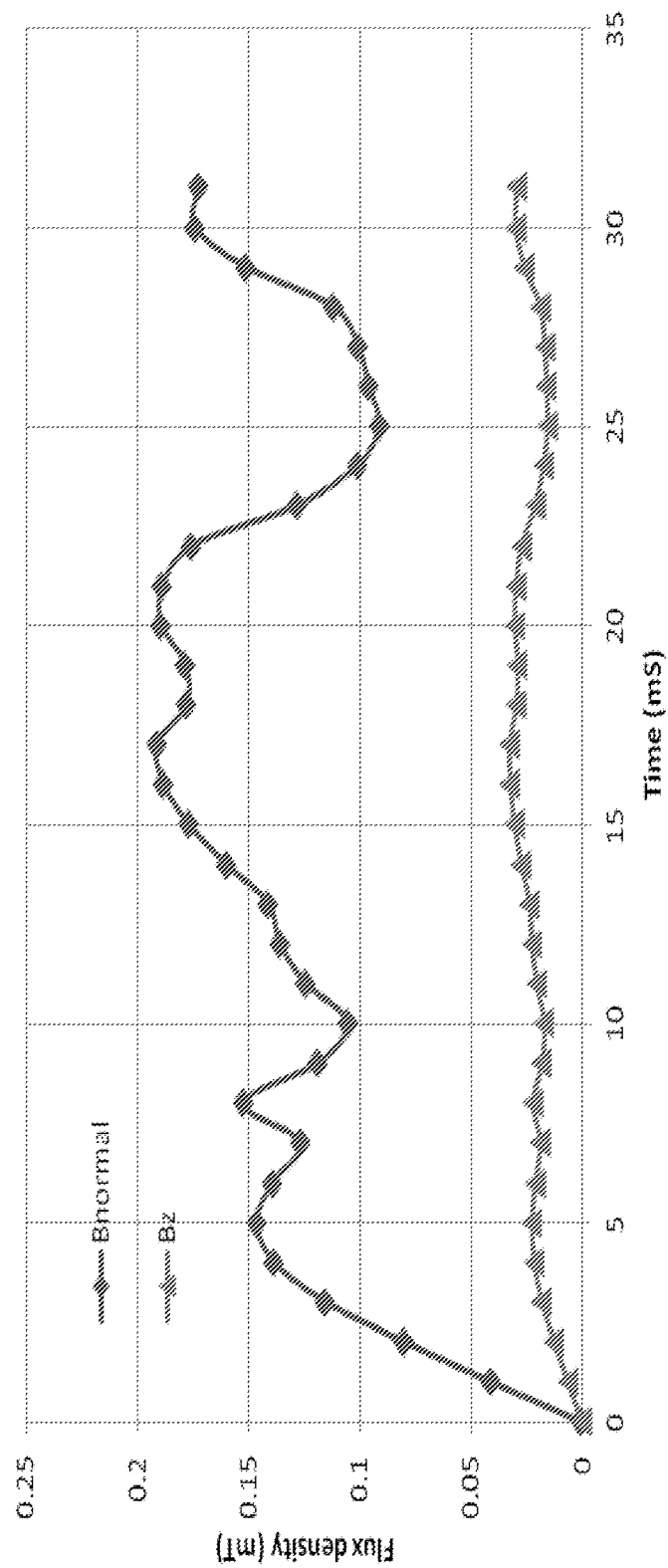
FIG. 7 shows the magnetic field strength at the center of the machine for a system having no shield.

FIG. 7 shows the magnetic flux density at the center of a 3 phase, 12 stator pole, 8 rotor pole SR machine resulting from the phase currents being fired as the machine rotates at 400 rpm. The results are for a prior art system. In this instance flux density Bz represents the flux density at the sensor element 8 along the central, z-axis of the SR machine (corresponding to the z-axis indicated in respect of the current invention in FIG. 4). Flux density Bnormal is the integral of all of the radial flux fields around the sensor element 8.

Figure 8:
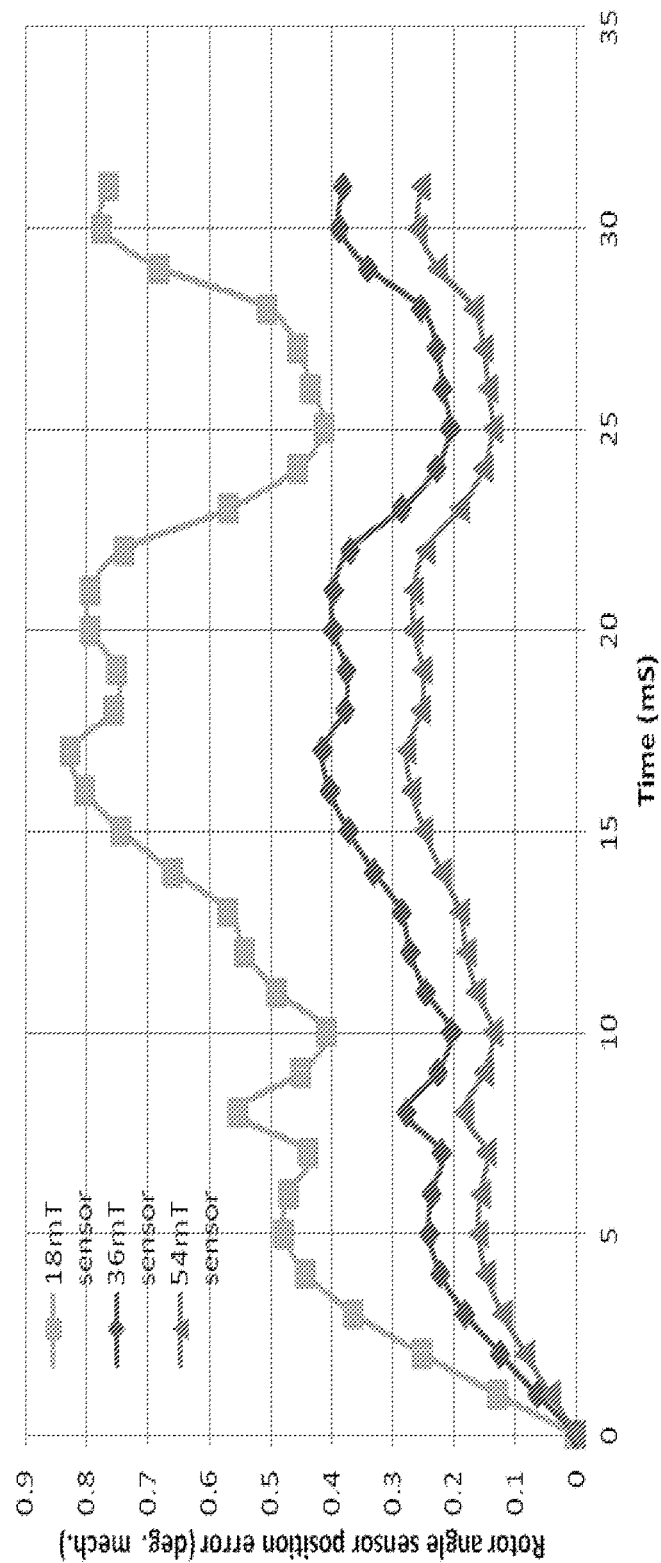
FIG. 8 shows the rotor angular position error of a sensing system having no shield.

FIG. 8 shows the position error of a prior art sensing system. Position error calculations can be performed for different levels of magnetic flux density at the sensor element site (signal noise ratio study). For the lowest value of sensor signal, the position error can be 0.8 degrees, which may cause feedback errors and ultimately loss of control.

Figure 9:
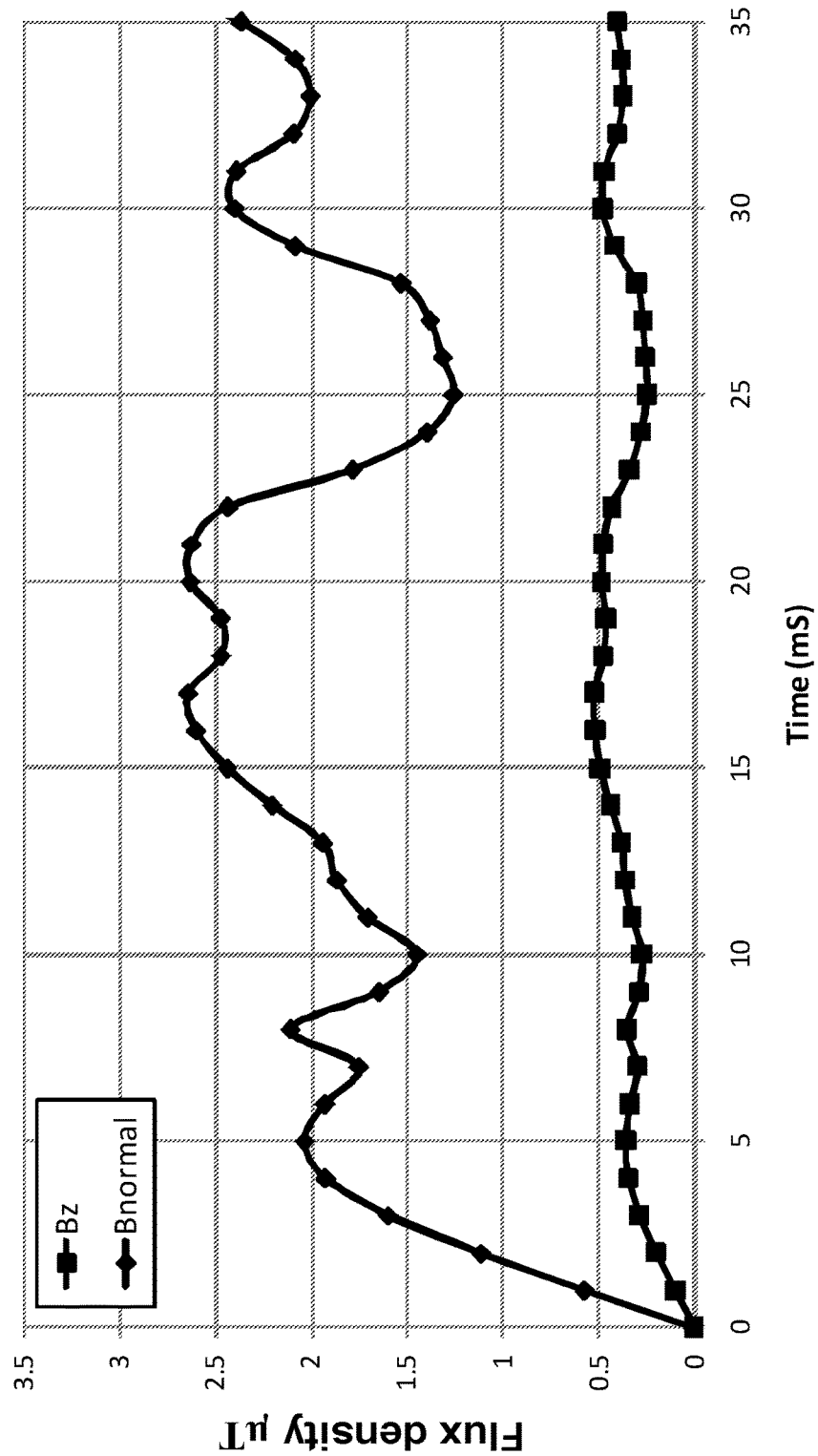
FIG. 9 shows the central magnetic field strength of a sensing system having a shield in accordance with the present invention.

FIG. 9 shows the central magnetic field of a sensing system with sensor shields and magnets in accordance with the present invention. It can be seen that this arrangement reduces the magnetic fields from the phase firing events at the center of the SR machine to negligible levels.

Figure 10:
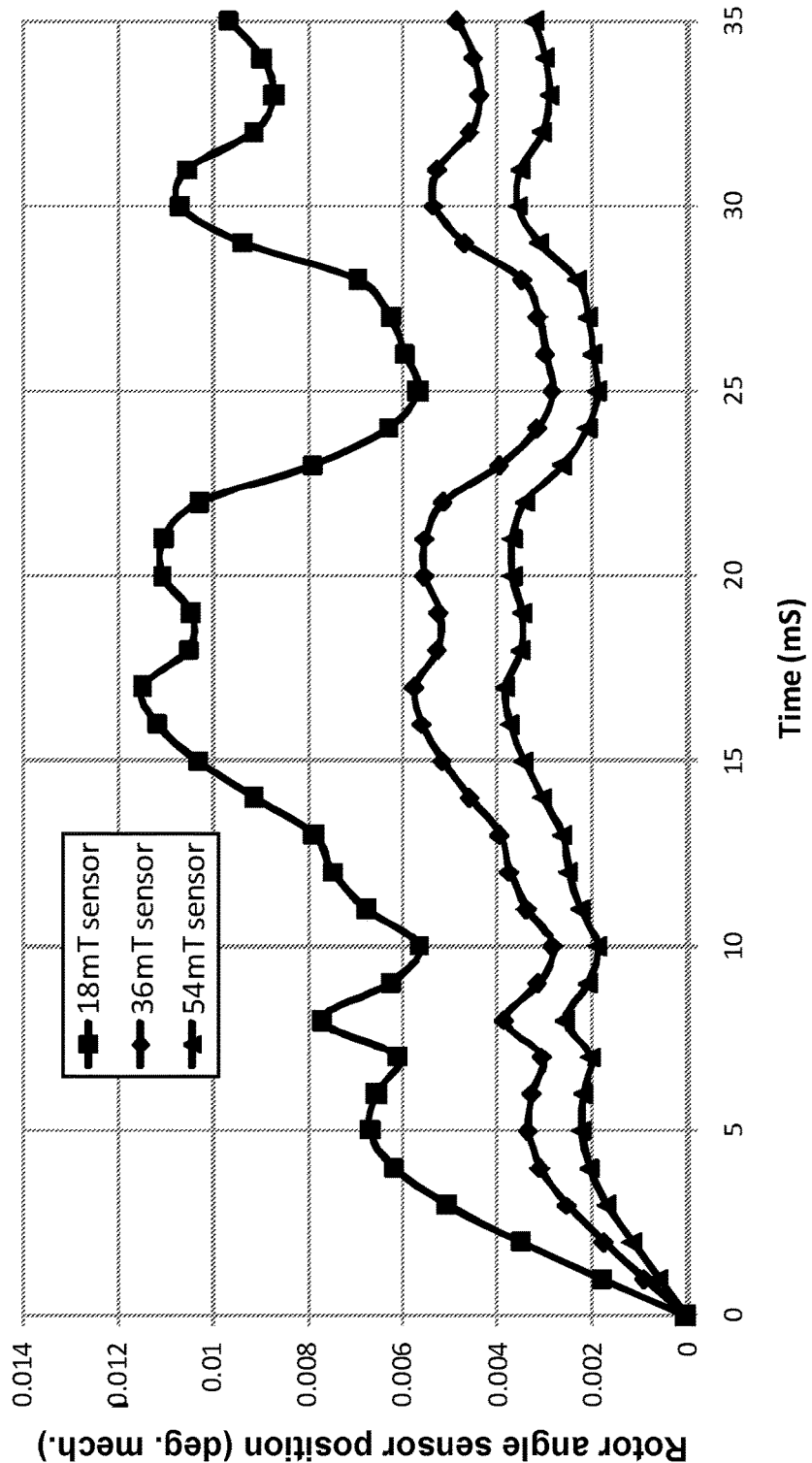
FIG. 10 is a graphical representation of the rotor angular position error of a sensing system with a shield in accordance with the present invention.

FIG. 10 shows the position error of a sensing system in accordance with the present invention. The position error can be 0.012 degrees which is unlikely to cause any significant feedback errors and is within the geometric tolerance of the sensor element alignment etc.

In the given examples, the maximum likely position error for an SR machine having a sensing system without a sensor shield is 0.8 degrees. The maximum magnitude of the magnetic field at the site of the sensor element 8 is approximately 0.2 mT.

The maximum likely position error for a machine having a sensing system in accordance with the present invention is 0.012 degrees. The maximum magnitude of the field at the sensor element site is 3 µT, which is smaller than the earth's magnetic field (which is between 30 µT and 60 µT).

Accordingly it can be seen that the sensing system of the present invention reduces the magnitude of magnetic flux density at the site of the sensor element 8 and the likely position error by a factor of approximately 70.

The rotor position error without the sensor shield 8 is likely to cause error feedback in the system, and ultimately uncontrolled operation of the SR machine. It must be noted however that other factors may affect the magnetic field at the central position and may compound the uncontrolled operation of the SR machine.

The sensor shield 10 and magnet arrangement of the present invention therefore provides a safeguard against offset rotor and stray magnetic fields from the electronics of an SR machine, which are very difficult to control in volume production, and which may compound the central magnetic field problems.

Figure 11:
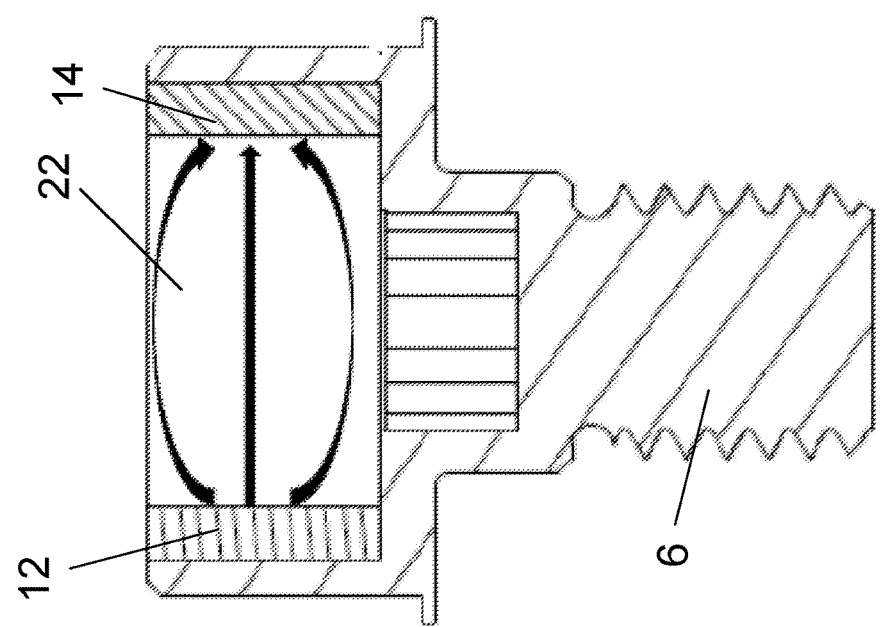
FIG. 11 is a representation of the flux tubes contained within the magnet carrier well in accordance with the present invention.

FIG. 11 shows the effect of the present invention on concentrating magnetic flux tubes 22 in a direction normal to an axis of the shaft of the SR machine.

The invention claimed is:

1. A position sensing system for a switched reluctance machine, the system comprising magnets, a magnet carrier, a sensor element, a magnet shield and a sensor shield, wherein the magnet carrier forms a well, the magnets being mounted on the magnet carrier inside the well, a gap being defined between the magnets, wherein the magnet carrier is mounted upon an end of a rotatable shaft of the switched reluctance machine such that the well is located substantially outside the rotatable shaft, wherein the sensor element is mounted on a circuit board and sits in the gap defined between the magnets in the well formed by the magnet carrier in a manner whereby magnetic flux produced by the magnets is concentrated within the well in a direction normal to an axis of the shaft of the switched reluctance machine, wherein the sensor shield surrounds the sensor element and the magnets such that the sensor shield shields the sensor element from electric interference caused by electrical switching of the switched reluctance machine, and wherein the magnet shield is disposed between the magnets and the sensor shield and surrounds the magnets, the sensor element and the circuit board.

2. A position sensing system claimed in claim 1 wherein the magnets are arranged such that the magnetic flux follows the path of a horseshoe magnet.

3. A position sensing system as claimed in claim 1 wherein the sensor shield which surrounds the sensor element encompasses the magnetic flux produced by the magnets.

4. A position sensing system as claimed in claim 2 wherein the sensor shield which surrounds the sensor element encompasses the magnetic flux produced by the magnets.

* * * * *